United States Patent
Utsch et al.

(10) Patent No.: US 10,167,204 B2
(45) Date of Patent: Jan. 1, 2019

(54) GRAVITY FILTER DESIGNS CONFIGURED FOR INCREASED RESIDENCE TIME

(71) Applicant: HELEN OF TROY LIMITED, St. Michael (BB)

(72) Inventors: Douglas Robert Utsch, Blanchester, OH (US); Vince Breidenbach, Lebanon, OH (US)

(73) Assignee: Helen of Troy Limited, St. Michael (BB)

( * ) Notice: Subject to any disclaimer, the term of this patent is extended or adjusted under 35 U.S.C. 154(b) by 204 days.

(21) Appl. No.: 15/047,455

(22) Filed: Feb. 18, 2016

(65) Prior Publication Data

US 2016/0167981 A1 Jun. 16, 2016

Related U.S. Application Data

(63) Continuation of application No. 13/716,645, filed on Dec. 17, 2012.

(60) Provisional application No. 61/576,392, filed on Dec. 16, 2011.

(51) Int. Cl.
| | |
|---|---|
| *C02F 1/28* | (2006.01) |
| *C02F 1/00* | (2006.01) |
| *B01D 27/02* | (2006.01) |
| *B01D 27/08* | (2006.01) |
| *B01D 27/14* | (2006.01) |

(52) U.S. Cl.
CPC .............. *C02F 1/003* (2013.01); *B01D 27/02* (2013.01); *B01D 27/08* (2013.01); *B01D 27/14* (2013.01); *C02F 1/283* (2013.01); *C02F 2201/006* (2013.01); *C02F 2307/04* (2013.01)

(58) Field of Classification Search
CPC .. C02F 1/003; C02F 1/283; C02F 1/44; C02F 2201/006; C02F 2307/04; B01D 27/02; B01D 27/08; B01D 27/14
See application file for complete search history.

(56) References Cited

U.S. PATENT DOCUMENTS 2,017,456 A * 10/1935 Gudmundsen .......... C02F 1/003
210/284
4,283,283 A * 8/1981 Zimmerman ........... C02F 1/003
210/282

(Continued)

*Primary Examiner* — Matthew O Savage
(74) *Attorney, Agent, or Firm* — Ulmer & Berne, LLP

(57) ABSTRACT

Embodiments of water filters comprise a filter housing configured to be disposed in a pour tray of a water filter pitcher, wherein a filter media cartridge is disposed inside the filter housing. The filter housing includes a housing floor, housing sidewalls extending upwardly, away from the housing floor, and at least one filter housing outlet disposed in one or more of the housing floor or the housing sidewalls. The filter media cartridge includes filter media, where the filter media cartridge comprises a cartridge floor spaced above the housing floor, cartridge sidewalls extending upwardly, away from the cartridge floor, and at least one filter media cartridge outlet disposed along one or more of the cartridge floor or the cartridge sidewalls. The water filter pitcher further includes a riser extending upwardly, away from the housing floor, and spaced between the housing sidewalls and the cartridge sidewalls, where the riser extends a distance above the cartridge floor. The riser forms a conduit volume.

16 Claims, 7 Drawing Sheets

(56) References Cited

U.S. PATENT DOCUMENTS

2004/0149642 A1* 8/2004 Vandenbelt ............. C02F 1/003
  210/282
2007/0227955 A1* 10/2007 Walde .................. B01D 35/157
  210/109
2010/0243583 A1* 9/2010 Riedel .................... C02F 1/001
  210/767

* cited by examiner

GRAVITY FILTER DESIGNS CONFIGURED FOR INCREASED RESIDENCE TIME

CROSS REFERENCE TO RELATED APPLICATIONS

This application is a continuation of U.S. patent application Ser. No. 13/716,645, filed Dec. 17, 2012, entitled "GRAVITY FILTER DESIGNS CONFIGURED FOR INCREASED RESIDENCE TIMES", which claims the priority benefit of U.S. Provisional Patent Application Ser. No. 61/576,392 filed Dec. 16, 2011, entitled "Gravity Filter Designs Configured for Increased Residence Time", each of which is incorporated by reference herein in their respective entirely.

TECHNICAL FIELD

The present invention is generally directed to water filters and, in particular, to water filters for water filter pitchers having water capture features.

BACKGROUND

Water filter pitchers including cartridge-style water filters are used by consumers who wish to remove visible and invisible impurities from tap water for drinking. Water filter pitchers allow a consumer to select to improve the flavor of tap water at an economical price as compared with purchasing packaged bottled water. Additionally, water filter pitchers incorporating cartridge water filters may decrease a consumer's waste of water and energy by providing the consumer with a ready supply of clean water.

In order to appeal to consumers, changes to the water filter pitchers that may improve the aesthetics of the water filter pitchers have been contemplated. One such change includes raising the filter media cartridge from the bottom of the water filter pitchers, such that the filter media cartridge becomes hidden from view. However, the filter media cartridges may have enhanced performance when the filter element is held in a moist condition. Accordingly, improvements that increase the aesthetic appeal of the water filter pitcher while improving the performance of the filter media cartridge are required.

SUMMARY

According to one embodiment, a water filter is configured to be inserted into a filter housing disposed in a pour tray of a water filter pitcher, where the filter housing includes a housing floor, housing sidewalls extending upwardly from the housing floor, at least one filter housing outlet disposed in the housing floor, the housing sidewalls, or both, and a riser extending upwardly from the housing floor. The water filter includes a filter media cartridge configured to be accommodated inside the filter housing and comprising filter media, where, when accommodated, the filter media cartridge comprises a cartridge floor spaced above the housing floor, cartridge sidewalls extending upwardly, away from the cartridge floor, and at least one filter media cartridge outlet disposed along one or more of the cartridge floor or the cartridge sidewalls. When the filter media cartridge is accommodated inside the filter housing, the riser is spaced between the housing sidewalls and the cartridge sidewalls and extends vertically above the cartridge floor, thereby forming a conduit volume.

According to another embodiment, a water filter pitcher includes a pitcher body that includes a pitcher floor and pitcher sidewalls extending from the pitcher floor, and a pour tray coupled to the pitcher body. The pour tray includes a pour tray floor, pour tray sidewalls extending upwards from the pour tray floor, a filter housing extending below the pour tray floor. The filter housing includes a housing floor, housing sidewalls extending between the housing floor and the pour tray floor, and at least one filter housing outlet disposed along one of more of the housing floor or the housing sidewalls. A filter media cartridge is disposed inside the filter housing and includes filter media, where the filter media cartridge further includes a cartridge floor spaced above the housing floor, cartridge sidewalls extending upwardly, away from the cartridge floor, and at least one filter media cartridge outlet disposed along one or more of the cartridge floor or the cartridge sidewalls. A riser extends upwardly from the housing floor and is spaced between the housing sidewalls and the cartridge sidewalls. The riser extends vertically above the cartridge floor, forming a conduit volume.

According to yet another embodiment, a method of maintaining wetness of a filter media cartridge includes providing a water filter pitcher that includes a filter housing that includes a housing floor, housing sidewalls vertically extending from the housing floor, and at least one filter housing outlet disposed in the housing floor adjacent to one or more of the housing sidewalls. The water filter pitcher also includes a filter media cartridge disposed inside the filter housing and including filter media, where the filter media cartridge includes a cartridge floor spaced above the housing floor, cartridge sidewalls extending upwardly, away from the cartridge floor, and at least one filter media cartridge outlet disposed in one or more of the cartridge floor or the cartridge sidewalls. The water filter pitcher further includes a riser extending upwardly from the housing floor and spaced between the housing sidewalls and the cartridge sidewalls. The riser extends a vertical distance above the cartridge floor, and the interior of the riser forms a conduit volume. The water filter pitcher includes a water outlet flowpath defined from the filter media cartridge outlet to the filter housing outlet, such that the water exiting the filter media cartridge must exit via the at least one filter media cartridge outlet into the conduit and then pass over the riser before exiting the filter housing via the at least one filter housing outlet. The method of maintaining wetness of the filter media cartridge also includes introducing water to the water filter pitcher, passing water into the filter media cartridge, filtering water with the filter media, and allowing water to exit the filter media cartridge through at least one filter media cartridge outlet. The method further includes pooling water in the conduit volume to wet at least a portion of the filter media cartridge; and displacing water over the riser and through the at least one filter housing outlet.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith.

Figure 1:
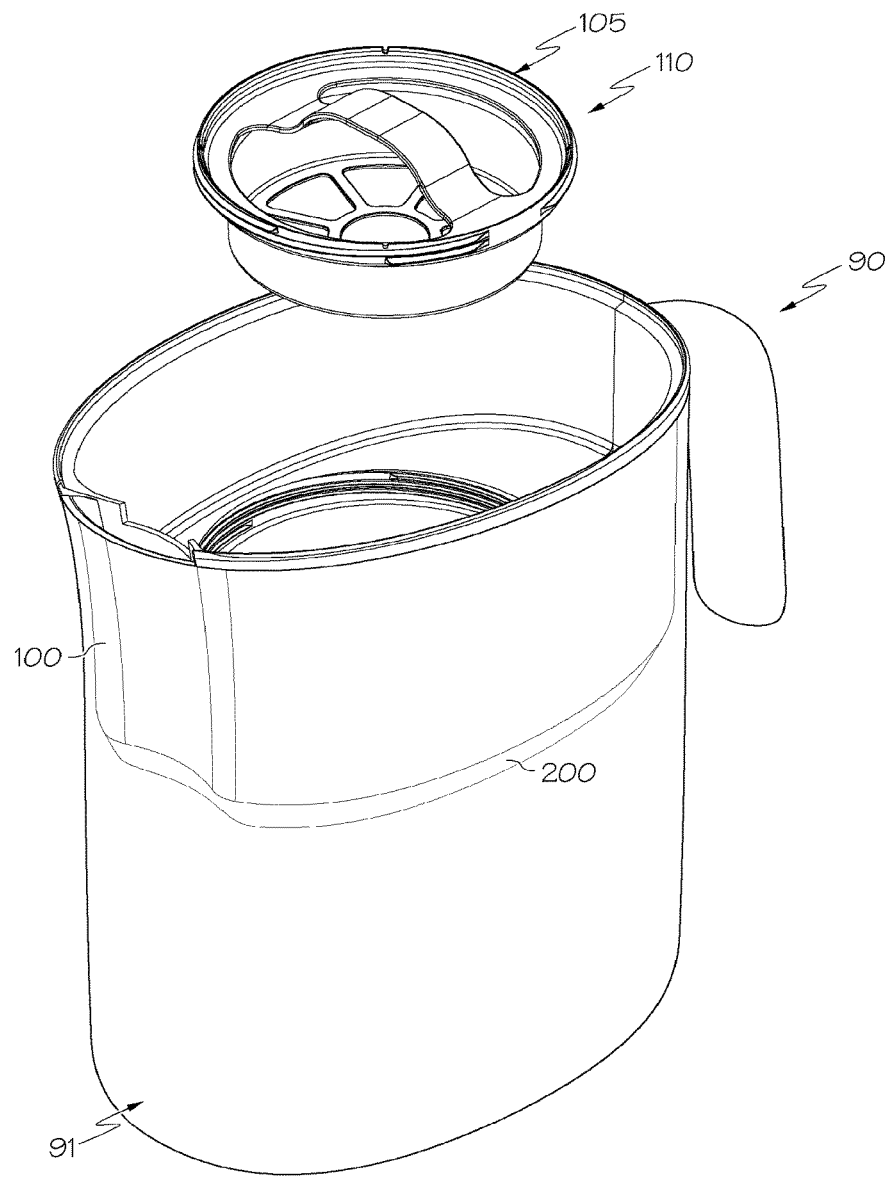
FIG. 1 is a perspective side view of a water filter pitcher according to one or more embodiments of the present invention.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Embodiments of the present invention are directed to water filters for water filter pitchers that are held above the region of filtered water storage of the water filter pitcher. To maintain moisture within the filter media within the water filter, the water filter pitchers include features that retain water that has been introduced into the filter media cartridge, and "pools" the water as to maintain wetness inside the filter media cartridge, thereby increasing the residence time that the water remains in contact with the filter media. Maintaining wetness of a filter media cartridge may prevent the filter media cartridge from drying, which may promote filtering efficiency and longevity of the filter media.

Figure 2:
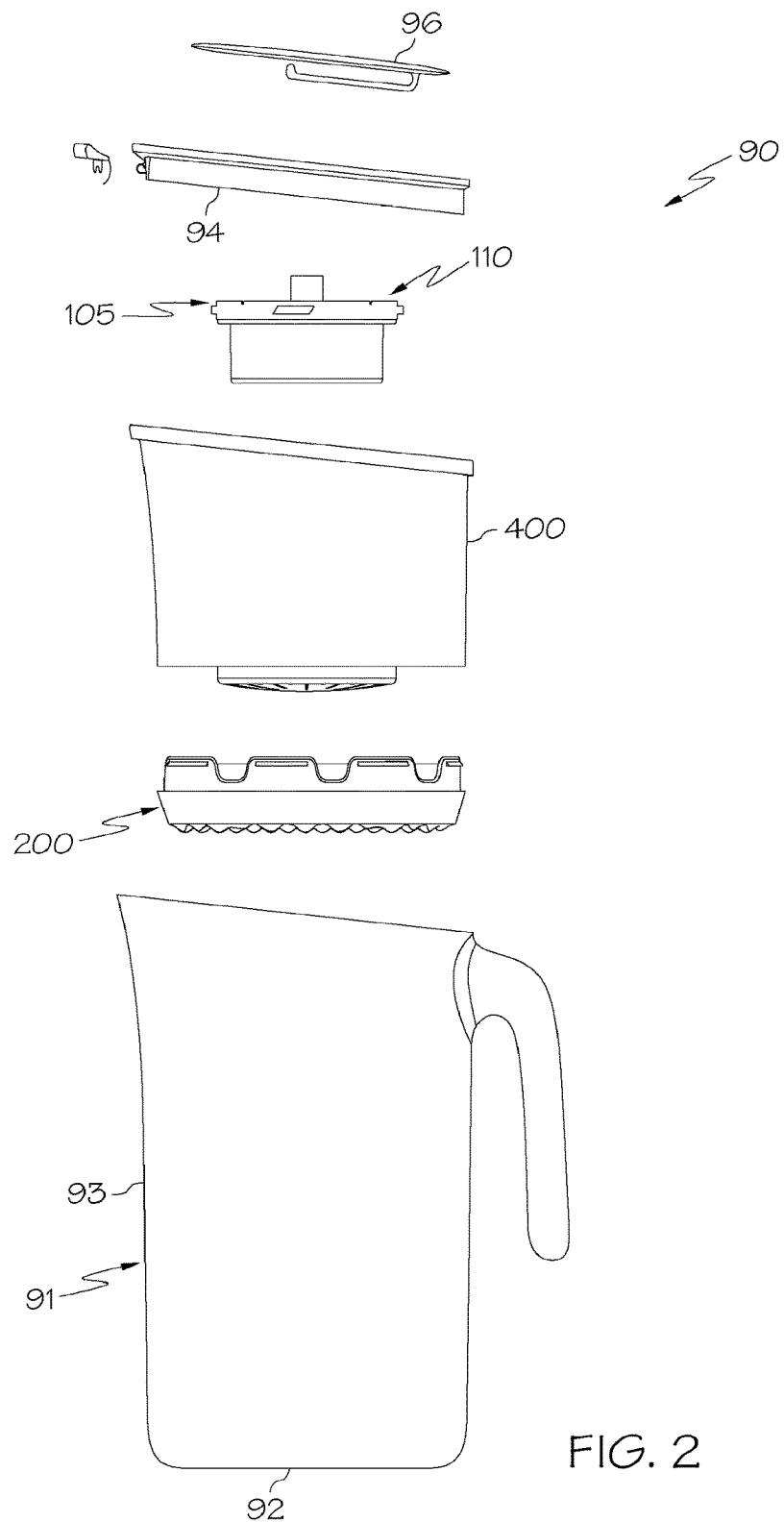
FIG. 2 is an exploded side view of a water filter pitcher according to one or more embodiments of the present invention.

Referring to FIGS. 1 and 2, embodiments of the water filter pitchers 90 include a pitcher body 91 and a pour tray 100. The pour tray 100 is inserted into the pitcher body 91 along the upper portion of the pitcher body 91. A water filter 105 that includes a filter media cartridge 110 is inserted into the pour tray 100. A water-tight seal is formed between the filter media cartridge 110 and the pour tray 100. Water, for example, tap water, may be introduced into the pour tray 100, where the water collects. The water is driven by gravity through the filter media cartridge 110 where the water filtered as it passes through filter media, and is collected in the lower portion of the pitcher body 91. The water filter pitcher 90 may further include a diffusion tray 200 that is coupled to an underside of the pour tray 100. The diffusion tray 200 may be in fluid communication with the filter media cartridge 110, such that water that exits the filter media cartridge 110 flows across the diffusion tray 200 before being collected in the pitcher body 91. As depicted in FIG. 1, the pour tray 100 and the diffusion tray 200 may extend less than about 50% of the height of the pitcher body 91. The water filter pitcher 90 may include a lid 94 that is inserted onto the pour tray 100 and a cover 96 that is inserted onto the lid 94. The lid 94 and the cover 96, together, may prevent foreign objects from entering the water filter pitcher 90.

Figure 3:
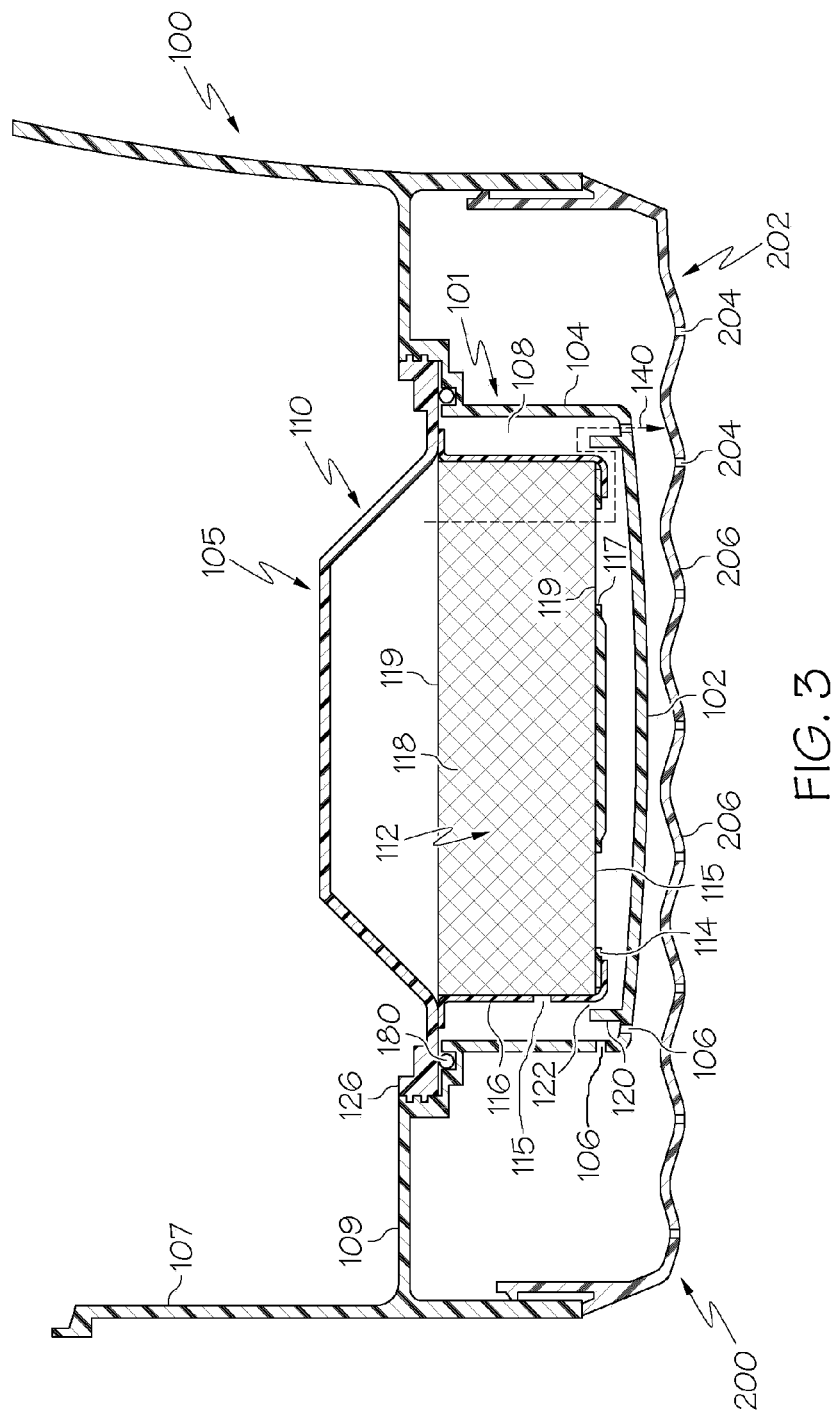
FIG. 3 is a sectional side view of a water filter pitcher according to one or more embodiments of the present invention.

Referring to FIG. 3, one embodiment of a pour tray 100 for a water filter pitcher 90 is depicted. The pour tray 100 includes a filter housing 101 that is formed into the pour tray 100, below the pour tray floor 109. The filter housing 101 includes a housing floor 102 and housing sidewalls 104 that extend from the housing floor 102. As shown in FIG. 3, the housing sidewalls 104 extend approximately vertically, creating a generally circular shape. The filter housing 101, through the housing floor 102 and the housing sidewalls 104, forms a recessed volume in the pour tray 100 into which the filter media cartridge 110 may be inserted. At least one filter housing outlet 106 passes through one of the housing floor 102 in a location adjacent to the housing sidewalls 104, or the housing sidewalls 104 in a location adjacent to the housing floor 102. In the embodiment depicted in FIG. 3, the filter housing outlet 106 includes openings that pass through the housing floor 102.

The water filter 105 includes the filter media cartridge 110 and the filter media 112. The filter media cartridge 110 includes a cartridge floor 114 and cartridge sidewalls 116 that extend upward from the cartridge floor 114. A filter media cartridge outlet 115 is located along one or more of the cartridge floor 114 or the cartridge sidewalls 116. Filter media 112 is retained in the interior region of the filter media cartridge 110 formed by the cartridge floor 114 and the cartridge sidewalls 116. The filter media 112 may include loose media 118, for example granulated activated carbon, that is held within the filter media cartridge 110 by permeable membranes 119. The permeable membranes 119 may be made from nonwoven filter media that contributes to filtering water that passes through the filter media cartridge 110. The filter media cartridge 110 further includes a filter cartridge outlet 117 located along the cartridge floor 114 that allows water to exit the filter media cartridge 110.

In the embodiment depicted in FIG. 3, the pour tray 100 further includes a riser 120 that extends upwardly, away from the housing floor 102, and is spaced between the housing sidewalls 104 and the cartridge sidewalls 116, when the filter media cartridge 110 is installed in the filter housing 101. In this embodiment, the housing sidewalls 104, the cartridge sidewalls 116, and the riser 120 each have a generally cylindrical shape, where the housing sidewalls 104, the cartridge sidewalls 116, and the riser 120 are generally concentric with one another. The riser 120 defines an interior volume that extends from the housing floor 102 to the top of the riser 120 to create a conduit volume 122. The conduit volume 122 may refer to the receptacle created by the surfaces of the riser 120 and the housing floor 102, and may also refer to an empty volume enclosed by these surfaces.

The filter media cartridge 110 and the filter housing 101 further define a cavity 108 located between the housing sidewalls 104 and the cartridge sidewalls 116. The filter cartridge outlet 117, the conduit volume 122, the cavity 108, and the filter housing outlet 106 are in fluid communication with one another.

Figure 4A:
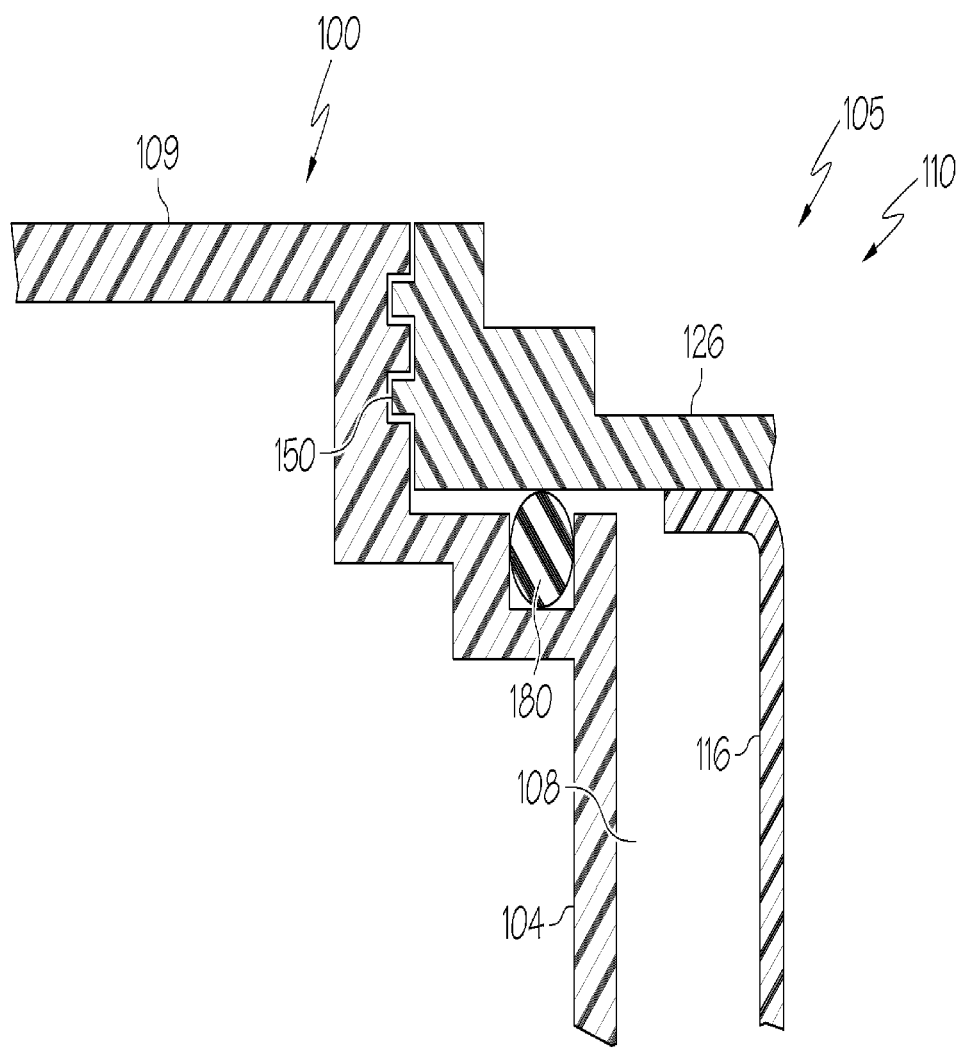
FIG. 4A is a sectional side view of a water filter pitcher according to one or more embodiments of the present invention.

The filter media cartridge 110 is secured to the pour tray 100 forming a water-tight seal between the filter media cartridge 110 and the pour tray 100. One embodiment of the interface between a lip 126 of the filter media cartridge 110 and the pour tray 100 shown in FIG. 3 is shown in greater detail in FIG. 4A. The lip 126 is a portion of the filter media cartridge 110 that extends radially beyond the cartridge sidewalls 116. In this embodiment, the lip 126 and the pour tray 100 include a threaded interface 150, as is also depicted in FIG. 1. The threaded interface 150 allows the filter media cartridge 110 to be secured against an O-ring 180, which forms a water-tight seal between the filter media cartridge 110 and the pour tray 100.

Figure 4B:
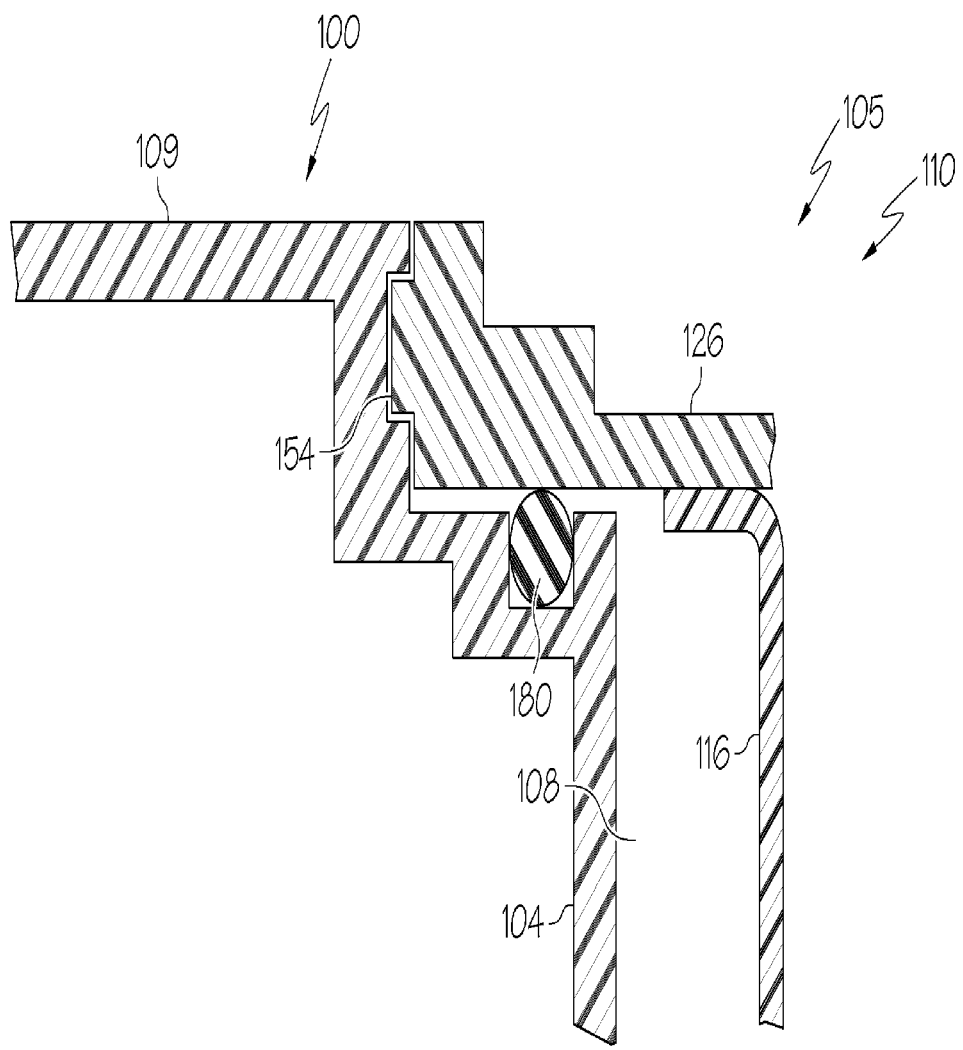
FIG. 4B is a sectional side view of a water filter pitcher according to one or more embodiments of the present invention.

Another embodiments of the interface between the lip 126 and the pour tray 100 is depicted in FIG. 4B. The embodiment depicted in FIG. 4B (and also depicted in FIG. 2) includes a bayonet-style fitting, where the lip 126 includes tabs 154 that are inserted into a channel along the pour tray 100. A bayonet-style fitting as depicted in FIG. 4B may allow for the filter media cartridge 110 to be secured within the pour tray 100 by rotating the filter media cartridge 110 relative to the pour tray 100, for example, by rotating the filter media cartridge 110 relative to the pour tray 100 less than a full revolution. The O-ring 180 may provide a slight force to maintain engagement of the tabs 154 with the channels. The tabs 154 may have a variety of cross-sectional shapes including, but not limited to, rectangular or circular.

The diffusion tray 200 is mechanically coupled to the underside of the pour tray 100 such that the diffusion tray 200 is in fluid communication with the filter housing outlet 106. The diffusion tray 200 includes a plurality of weep holes 204 arranged along the diffusion tray floor 202. Water that exits the filter housing outlet 106 flows to the diffusion tray 200 and redistributes along the diffusion tray floor 202, until the water flows through the weep holes 204. The diffusion tray floor 202 of the diffusion tray 200 may be contoured to direct the flow of the water as the water comes into contact with the diffusion tray floor 202 of the diffusion tray 200. For example, the weep holes 204 may be positioned at a constant vertical distance from the filter housing outlet 106 in an envelope defined by the housing sidewalls 104, and may be positioned at a vertical distance from the filter housing outlet 106 where the vertical distance increases as the radial distance from the envelope defined by the housing sidewalls 104 increases. The diffusion tray floor 202 of the diffusion tray 200 may further include an undulating surface that forms a series of depressions 206 along the diffusion tray floor 202. The weep holes 204 may be positioned near the lowest portion of the depressions 206, such that the weep holes 204 are positioned in the depressions 206 at approximately the furthest vertical distance from the filter housing outlet 106.

Still referring to FIG. 3, the water filter 105 includes filter media 112 that may remove impurities, for example, protozoa, viruses, lead, organic and inorganic compounds, and/or turbidity, from water. Removal of impurities may be targeted to satisfy the requirements of water purification standards including, but not limited to, NSF/ANSI Standard 42 and/or NSF/ANSI Standard 53. Removal of impurities is desirable, as these impurities may affect the taste, odor, and/or the appearance of the water. In one embodiment, the filter media 112 includes granulated activated carbon. Impurities in the water physically bond with the granulated activated carbon through adsorption, and are removed from the water prior to the water exiting the filter media cartridge 110. Granulated activated carbon may be more likely to bond with impurities in the water (i.e., have higher rates of adsorption) when the granulated activated carbon itself is maintained in a wet environment.

As illustrated in the embodiment depicted in FIGS. 1 and 2, the pour tray 100, and therefore the filter media cartridge 110, is held in a position a vertical distance above the lower portion of the pitcher body 91, where water that has passed through the filter media cartridge 110 collects. In this embodiment, the vertical distance from the of the diffusion tray floor 202 of the diffusion tray 200, and therefore the vertical distance from the filter housing outlet 106, to the pitcher floor 92 of the pitcher body 91 is less than about 50% of the vertical distance that the pitcher sidewalls 93 extend from the pitcher floor 92 of the pitcher body 91. This may be important because a user of the water filter pitcher 90 may perceive that the water filter pitcher 90 is "full" when the level of water in the pitcher body 91 reaches the level of the diffusion tray floor 202 of the diffusion tray 200. Therefore, none of the filter media cartridge 110, and therefore the filter media 112, may be submerged in water that has passed through the filter media cartridge 110 and collected in the lower portion of the pitcher body 91.

To maintain wetness of the filter media 112, the pour tray 100 depicted in FIG. 3 includes features that collect water that has been introduced to the pour tray 100 and at least partially passed through the filter media cartridge 110. These features allow the water filter pitcher 90 to maintain wetness of the filter media cartridge 110 and the filter media 112. Water that is introduced to the pour tray 100, for example, from a tap, follows a water outlet flowpath 140 through the water filter pitcher 90. Water first collects in the pour tray 100 in the volume defined by the pour tray sidewalls 107, and flows along the pour tray floor 109 towards the filter housing 101 and the filter media cartridge 110 inserted therein. The water enters the filter media cartridge 110 and is filtered by the filter media 112. The water exits the filter media cartridge 110 through the filter cartridge outlet 117. Water flowing out of the filter media cartridge 110 is collected in the conduit volume 122 formed in the filter housing 101 by the riser 120. The water is collected within the conduit volume 122 until the volume of water exceeds the volume of the conduit volume 122, at which point the level of the water will exceed the height of the riser 120. Water that exceeds the height of the riser 120 will flow over the riser 120 into the cavity 108. From here, water will flow through the filter housing outlet 106 and into the lower portion of the pitcher body 91.

The riser 120 maintains water in the conduit volume 122, such that the water is pooled inside the conduit volume 122 at a height relative to the cartridge floor 114 that corresponds to the vertical height of the riser 120 relative to the cartridge floor 114. As depicted in FIG. 3, the top of the riser 120 is positioned above the bottom of the cartridge floor 114. The configuration depicted in FIG. 3 represents approximately the minimum height of the riser 120. When water is pooled in the conduit volume 122, the water will come into contact with the filter media 112, such that the water will maintain wetness of at least a portion of the filter media 112. The maximum height of the riser 120 corresponds with a riser 120 that extends beyond the cartridge floor 114 but does not contact the filter media cartridge 110. In any of the envisioned configurations, the height of the riser 120 corresponds to a volume of water held within the conduit volume 122, where the water will remain in contact with the filter media 112.

By pooling the water in the conduit volume 122, the residence time of the water in contact with the filter media 112 in the filter media cartridge 110 is, therefore, increased as water is held in the conduit volume 122, such that the water remains in contact with the filter media 112 located within the filter media cartridge 110. Additionally, maintaining wetness in the filter media 112 may prevent the grown of bacteria and biofilm, while maintaining the chemical reduction performance of the filter media 112 over the life of the filter media cartridge 110.

As discussed above, other embodiments of the water filter pitcher 90 may include risers 120 that extend in a vertical distance beyond the cartridge floor 114. Such risers 120 having increased heights relative to the cartridge floor 114 may maintain wetness of a larger portion of the filter media cartridge 110, and therefore maintain wetness of a larger portion of the filter media 112 as compared to risers 120 having decreased heights relative to the cartridge floor 114.

Though regular use of the water filter pitcher 90, the conduit volume 122 will periodically be flushed by water that is introduced to the pour tray 100. The periodic introduction of water into the pour tray 100 and through the filter media cartridge 110 tends to flush water from the conduit volume 122 by displacing that water from the conduit volume 122. The periodic flushing of the conduit volume 122 maintains water in the conduit volume 122 and continues to provide increased residence time of water in contact with the filter media 112 in the filter media cartridge 110, while enabling water to flow to the lower portion of the pitcher body 91.

Figure 5:
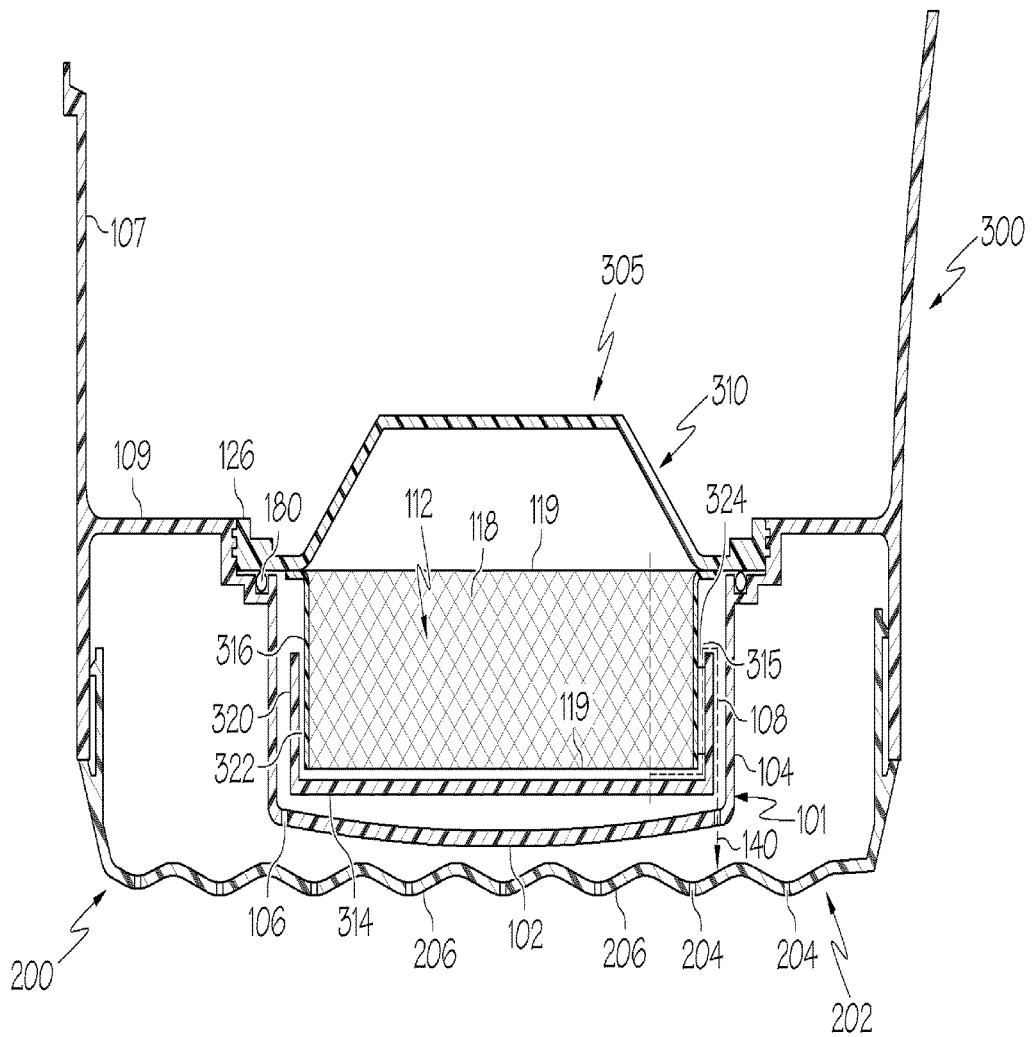
FIG. 5 is a sectional side view of a water filter pitcher according to one or more embodiments of the present invention.

Referring now to FIG. 5, another embodiment of the water filter pitcher 90 is depicted. Many of the features of this embodiment are similar to the features described above in regard to FIGS. 3 and 4A. In this embodiment, the riser 320 is integrated into the filter media cartridge 310. The riser 320 extends upwardly from the cartridge floor 314, and away from the housing floor 102. As depicted in FIG. 5, the riser 320 extends a vertical distance above the cartridge floor 314, forming a conduit volume 322 in the region between the riser 320 and the cartridge sidewalls 316. The riser 320 may be supported relative to the cartridge sidewalls 316 by at least one rib 324 extending between the riser 320 and the cartridge sidewalls 316. The conduit volume 322 may refer to the receptacle created by the surfaces of the riser 320 and the cartridge floor 314, and may also refer to an empty volume enclosed by these surfaces.

Water that is introduced to the pour tray 300 travels along the pour tray floor 109 to the water filter 305. The water enters the filter media cartridge 310 and the filter media 112, and the water is filtered by the filter media 112. The water exits the filter media 112 and flows into the conduit volume 322 formed in the filter media cartridge 310 by the riser 320. The water is collected within the conduit volume 322 formed in the filter media cartridge 310 by the riser 320. The water pools within the conduit volume 322 until the volume of water exceeds the volume of the conduit volume 322, at which point the level of the water will exceed the height of the riser 320. Water that exceeds the height of the riser 320 will flow over the riser 320, through the filter media cartridge outlet 315, and into the cavity 108. Water will then flow from the cavity 108 through the filter housing outlet 106 and into the lower portion of the pitcher body 91.

The riser 320 maintains water in the conduit volume 322, such that the water is pooled inside the conduit volume 322 at a height relative to the cartridge floor 314 that corresponds to the vertical height of the riser 320 relative to the cartridge floor 314. As depicted in FIG. 5, the vertical height of the riser 320 is above the bottom of the cartridge floor 314. When water is pooled in the conduit volume 322, the water will come into contact with the filter media 112 inside the filter media cartridge 310, such that the water will maintain wetness of at least a portion of the filter media 112. By pooling the water in the conduit volume 322, the residence time of the water in the filter media cartridge 310 and, therefore in contact with the filter media 112, is increased.

Referring now to FIGS. 3 and 5, the plurality of weep holes 204 in the diffusion tray 200 may allow water to flow through the weep holes 204 into the lower portion of the pitcher body 91 in discrete streams. Properties of the weep holes 204, for example diameter and spacing, may be adjusted at the time of manufacture to control the rate of flow of the discrete streams. In one embodiment, these discrete streams may be controlled to simulate, visually and aurally, rainfall. The discreet streams may be pleasing to a consumer. Further, use of these discrete streams may serve as a source identifier for the water filter pitcher 90, such that a consumer who is interested in purchasing a water filter pitcher 90 is able to identify the brand of the water filter pitcher 90 by a description of the discrete streams, or by a sensing, visually and/or aurally, the discrete streams as water flows through the weep holes 204 and into the lower portion of the pitcher body 91.

Figure 6:
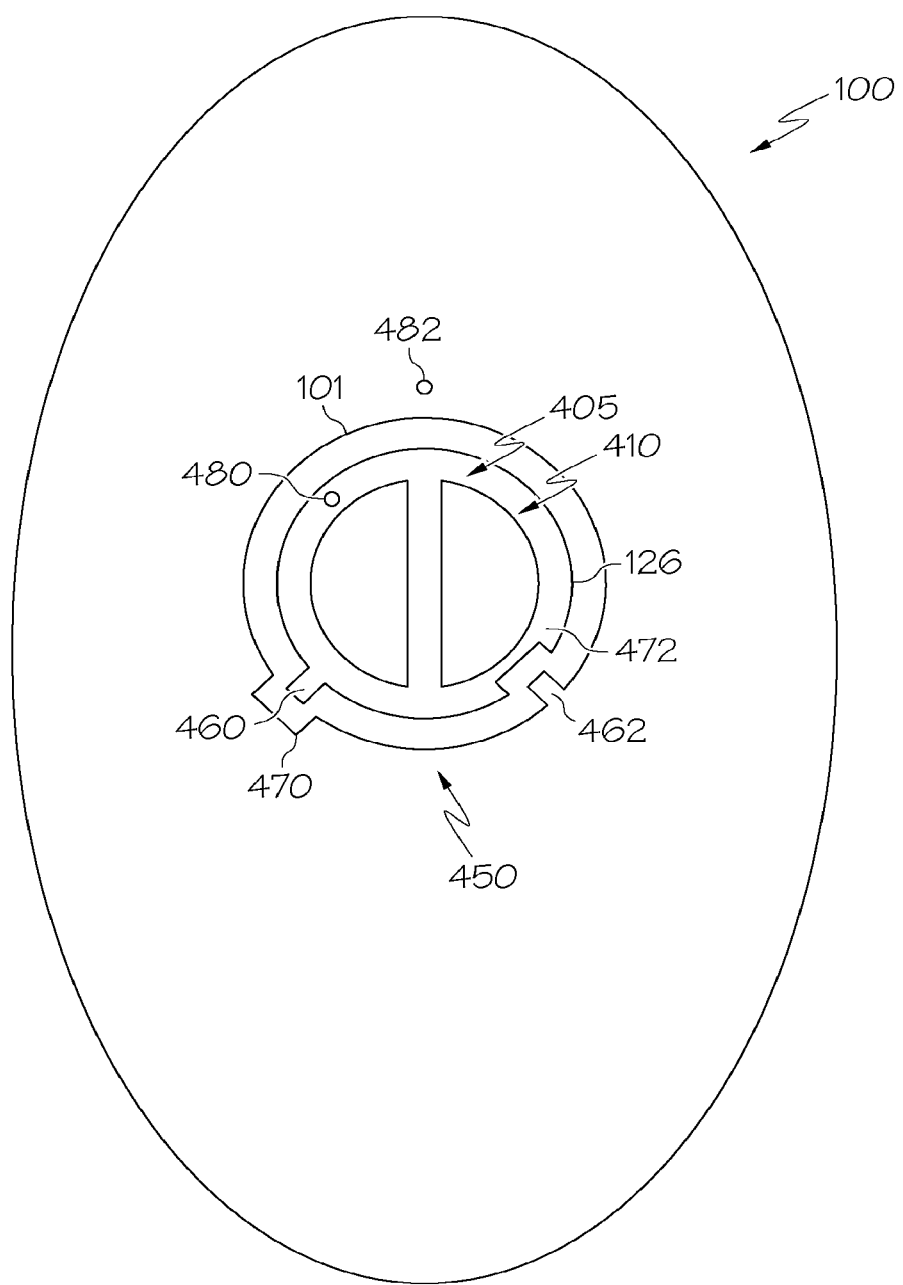
FIG. 6 is a top view of a water filter pitcher according to one or more embodiments of the present invention.

Referring now to FIG. 6, one embodiment of the pour tray 100 may include a lock-and-key mechanism 450 that is used to secure the water filter 405 within the filter housing 101 of the pour tray 100. The lock-and-key mechanism 450 includes a first key 460 located along the lip 126 of the filter media cartridge 410 and a first keyway 470 located in an area proximate to the filter housing 101 of the pour tray 100. Additionally, the locking mechanism may include a second key 462 located in an area proximate to the filter housing 101 of the pour tray 100 and a second keyway 472 located on the lip 126 of the filter media cartridge 410. While specific locations of the first key 460 and the second key 462, as well as the corresponding first keyway 470 and second keyway 472 have been given, the locations and quantity of the features that form the lock-and-key mechanism 450 may vary between the filter media cartridge 410 and the pour tray 100.

As depicted in FIG. 6, the first key 460 and the second key 462 may include protrusions that extend away from one of the filter media cartridge 410 or the filter housing 101, respectively. The first key 460 and the second key 462 may have a variety of shapes including, but not limited to, cylindrical or rectangular cross-sectional shapes. Other shapes and orientations of the first and second keys 460, 462, as well as the corresponding first and second keyways 470, 472 are envisioned.

To install the filter media cartridge 410 into the filter housing 101, the first key 460 is aligned with the first keyway 470 and the second key 462 is aligned with the second keyway 472. With the respective first and second keys 460, 462 and first and second keyways 470, 472 aligned with one another, the filter media cartridge 410 may be seated into the filter housing 101. Once the first and second keys 460, 462 have been aligned with the first and second keyways 470, 472, the filter media cartridge 410 may be secured within the pour tray 100, forming a water tight seal as to direct the flow of water from the pour tray 100 through the filter media cartridge 410.

The lock-and-key mechanism 450 may restrict the use of some water filters 405 with the water filter pitcher 90. In some embodiments, only water filters 405 and filter housings 101 of pour trays 100 that have first and second keys 460, 462 that are appropriately located for the first and second keyways 470, 472 may be secured to one another. By preventing water filters 405 that do not include appropriate lock-and-key mechanisms 450 from being secured within the filter housing 101 of the pour tray 100, a user of the water filter pitcher 90 may be able to ensure that the water filter 405 is supplied from the manufacturer of the water filter pitcher 90.

Thus, the lock-and-key mechanism 450 may serve as a source identifier to a consumer, such that a consumer is able to identify that the water filter 405 is connected to the manufacturer of the water filter pitcher 90 and/or authorized to provide components for the water filter pitcher 90. This may be important for consumable products, for example replacement water filters 405, because the replacement water filters 405 are often packaged and purchased separately by the consumer after the time of purchase of the water filter pitcher 90. By allowing the consumer to identify the source of the replacement water filter 405, the consumer may be assured that the replacement water filter 405 will filter water at the same level of performance as the original water filter 405 supplied with the water filter pitcher 90. Thus, the consumer can be assured that through using an appropriate replacement water filter 405, the water filter pitcher 90 will continue to filter water to the taste, smell, and appearance that the consumer has become familiar with.

Additionally, embodiments of the pour tray 100 and the filter media cartridge 410 may include positive engagement indicators that indicate to a user accurate installation of the filter media cartridge 410 within the pour tray 100. The positive engagement indicators may be included in one or more of the filter media cartridge 410 or the pour tray 100. The positive engagement indicators may also be integrated into the lock-and-key mechanism 450. The positive engagement indicators provide the user with an indication, for example, an aural, a tactile, a visual and/or an olfactory signal, that the filter media cartridge 410 has been properly seated within the pour tray 100.

As depicted in FIG. 6, positive engagement indicators delivering a visual signal to the user may include a cartridge indicia 480 positioned along the filter media cartridge 410 and a pour tray indicia 482 positioned along the pour tray 100. As the filter media cartridge 410 is inserted into the filter housing 101 of the pour tray 100, aligning the lock-and-key mechanism 450 prevents the cartridge indicia 480 and the pour tray indicia 482 from being aligned. As the filter media cartridge 410 is seated into the pour tray 100, for example by turning the filter media cartridge 410 clockwise relative to the pour tray 100 approximately ⅛ of a revolution, the cartridge indicia 480 will align with the pour tray indicia 482. With the cartridge indicia 480 aligned with the pour tray indicia 482, the positive engagement indicators may assist with communicating to a user that the filter media cartridge 410 is property seated within the pour tray 100 and ready for use.

It should now be understood that water filters for gravity filter water filter pitchers may include features that are configured for increased residence time of water in contact with the filter media in the water filters. By increasing the residence time of water introduced into the water filter, the water filter, and therefore the filter media, may be kept above the lower portion of the water filter pitcher. This may improve the visual and/or aural appeal of a water filter pitcher. Additionally, the water filter pitcher and the filter media cartridge may include features that limit the insertion of water filters to only those that are acceptable as determined by the manufacturer.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

What is claimed is:

1. A water filter pitcher assembly comprising:
    a pitcher body comprising a pitcher floor and a pitcher sidewall extending from the pitcher floor; and
    a pour tray coupled to the pitcher body, the pour tray comprising:
        a pour tray floor;
        a pour tray sidewall extending upward from the pour tray floor; and
        a filter housing extending below the pour tray floor, the filter housing comprising a housing floor, a housing sidewall extending between the housing floor and the pour tray floor, and at least one filter housing outlet disposed along one of more of the housing floor and the housing sidewall;
    a filter media cartridge disposed inside the filter housing comprising filter media, wherein the filter media cartridge further comprises a cartridge floor spaced above the housing floor, a cartridge sidewall extending away from the cartridge floor, and at least one filter media cartridge outlet disposed along one or more of the cartridge floor and the cartridge sidewall; and
    a riser spaced between the housing sidewall and the cartridge sidewall and extending vertically above the cartridge floor, and wherein the riser forms a conduit volume that surrounds a bottom portion of said cartridge sidewall.

2. The water filter pitcher assembly of claim 1, further comprising a water outlet flowpath defined from the filter media cartridge outlet to the filter housing outlet, and configured such that the water exiting the filter media cartridge must exit via the at least one filter media cartridge outlet into the conduit volume and then pass over the riser before exiting the filter housing via the at least one filter housing outlet.

3. The water filter pitcher assembly of claim 1, wherein at least some water remains in contact with the filter media after water is introduced to the pitcher body.

4. The water filter pitcher assembly of claim 1, wherein a vertical distance from the pitcher floor to the at least one filter housing outlet is less than about 50% of a vertical distance that the pitcher sidewall extends from the pitcher floor.

5. The water filter pitcher assembly of claim 1, wherein the riser extends from the housing floor.

6. The water filter pitcher assembly of claim 1, wherein the riser extends from the cartridge floor.

7. The water filter pitcher assembly of claim 6, wherein the riser is attached to the cartridge sidewall by at least one rib.

8. The water filter pitcher assembly of claim 1, further comprising a diffusion tray located below the at least one filter housing outlet, the diffusion tray comprising a diffusion tray floor comprising a plurality of depressions that form an undulating surface, and a plurality of weep holes passing through the diffusion tray floor at locations corresponding to at least one of the depressions, wherein the diffusion tray is configured such that water exiting from the at least one filter housing outlet is directed to the depressions and passes through the plurality of weep holes.

9. The water filter pitcher assembly of claim 1, further comprising a cavity disposed between the housing sidewall and the cartridge sidewall, wherein the cavity is configured to be in fluid communication with the conduit volume.

10. The water filter pitcher assembly of claim 1, wherein the filter media further comprises a nonwoven filter media adjacent to the cartridge floor and loose fill filtration media adjacent to the nonwoven filter media and the cartridge sidewall.

11. The water filter pitcher assembly of claim 1, wherein the filter media cartridge is coupled to the filter housing to form a water-right seal between the pour tray and the filter media cartridge, and is configured such that water introduced to the pour tray exits through the at least one filter media cartridge outlet.

12. The water filter pitcher assembly of claim 1, wherein the filter media cartridge further comprises a retention lip that extends in a radial direction outward from the cartridge sidewall.

13. The water filter pitcher assembly of claim 12, wherein the retention lip is operable to interlock with the pour tray.

14. The water filter pitcher assembly of claim 12, wherein the filter media cartridge further comprises at least one key operable to engage at least one keyway of the pour tray.

15. The water filter pitcher assembly of claim 14, wherein the filter media cartridge is rotatable within the filter housing and is configured such that when the at least one key engages the at least one keyway and the filter media cartridge forms a water-tight seal with the pour tray, that water introduced to the pour tray exits through the at least one filter media cartridge outlet.

16. The water filter pitcher assembly of claim 1, wherein the filter media cartridge contains granular activated carbon.

* * * * *